United States Patent [11] 3,593,259

| [72] | Inventor | Milo E. Stormo<br>Granada Hills, Calif. |
|---|---|---|
| [21] | Appl. No. | 778,520 |
| [22] | Filed | Nov. 25, 1968 |
| [45] | Patented | June 13, 1971 |
| [73] | Assignee | Singer-General Precision, Inc. |

[54] ALPHA-GAMMA FLIGHT PATH DISPLAY
1 Claim, 7 Drawing Figs.

| [52] | U.S. Cl. | 340/27 NA |
|---|---|---|
| [51] | Int. Cl. | B64d 45/08 |
| [50] | Field of Search | 340/27 NA;<br>350/166, 174 |

[56] References Cited
UNITED STATES PATENTS

| 2,453,697 | 11/1948 | Brown | 356/251 |
|---|---|---|---|
| 3,005,185 | 10/1961 | Cumming et al. | 340/27 |
| 3,230,819 | 1/1966 | Noxon | 350/174 X |

*Primary Examiner*—Kathleen H. Claffy
*Assistant Examiner*—Jan S. Black
*Attorneys*—Joseph R. Dwyer and Linval B. Castle ABSTRACT: An electrooptical aircraft flight instrument that accepts input signals representing angle of attack and pitch angle. These signals are used to servo reticles that are projected at infinity upon a transparent screen in the pilot's normal line of sight and display the actual flight path of the aircraft and the angle, in degrees, between that flight path and the horizon.

INVENTOR.
MILO E. STORMO

PATENTED JUL13 1971

INVENTOR.
MILO E. STORMO
BY
ATTORNEYS 3,593,259

ALPHA-GAMMA FLIGHT PATH DISPLAY

CROSS REFERENCE TO RELATED APPLICATIONS

The invention disclosed herein is an improvement over that described in copending U.S. Pat. application, Ser. No. 744,397, filed July 12, 1968, entitled "FLIGHT PATH DISPLAY." The copending application describes a similar type of flight instrument that accepts only the angle of attack input signal and displays a mark representing the actual flight path of the aircraft through the air mass. This mark is optically projected at infinity onto a transparent screen, and therefore into the real world coordinates so that the projection shows the pilot his actual touch down point upon the airport runway.

BACKGROUND OF THE INVENTION

There are many types of instruments to aid the pilot in making approaches and landing during inclement weather when the airport is below visual flight rule conditions. However, when the weather is clear and when instrument landing facilities are not available, the pilot is without external assistance and must rely solely upon his judgment in planning his landing approach. While this presents no serious problem to pilots of smaller aircraft, it is of some serious concern to crews of larger aircraft which, when in a landing configuration, cannot readily be maneuvered to correct for unusual deviations from the intended fligh' path. This invention assists the pilot in planning an accurate approach by projecting into the pilot's line of sight, and against a background of the airport runway, an illuminated mark showing the precise point upon the runway at which the aircraft will touch down.

In order to decrease aircraft generated noise around some of the larger metropolitan airports, there are statutes in some areas that require large aircraft to approach the airport at a glide slope angle, $\gamma$, of not less than 6°. This invention provides an accurate means of determining such a glide slope angle by providing a scale, calibrated in degrees, projected into the pilot's line of sight upon a transparent screen. The scale will, regardless of the aircraft altitude, position the 0° marker upon the horizon and will show, in degrees, the angle between the horizon and any object selected by the pilot through the transparent screen. Such a selected object would normally be the touch down point, as viewed through the transparent screen. Thus, the pilot may easily set up a desired glide slope angle by merely positioning his aircraft so that the selected glide slope angle, as viewed through the transparent screen, coincides with the touch down point on the aircraft runway. To land at that touchdown point, the pilot then makes the necessary speed and altitude adjustments so that the angle of attack marker that is projected onto the transparent screen will also continue with the desired touch down point on the runway.

SUMMARY OF THE INVENTION

Briefly described, the invention comprises an optical display instrument which receives signals representing pitch angle and angle of attack from the aircraft sensors. These signals drive servos which position backlighted reticles that are located in the principal focal plane of an optical system that projects the reticle images upon a transparent screen positioned in the pilot's line of sight. Because these images projected into the pilot's sight are focused at infinity, the pilot, without eye refocussing, observes the images as if they were projected upon the terrain or sky background.

DESCRIPTION OF THE DRAWINGS

In the drawings which illustrate a preferred embodiment of the invention.

DETAILED DESCRIPTION

Figure 1:
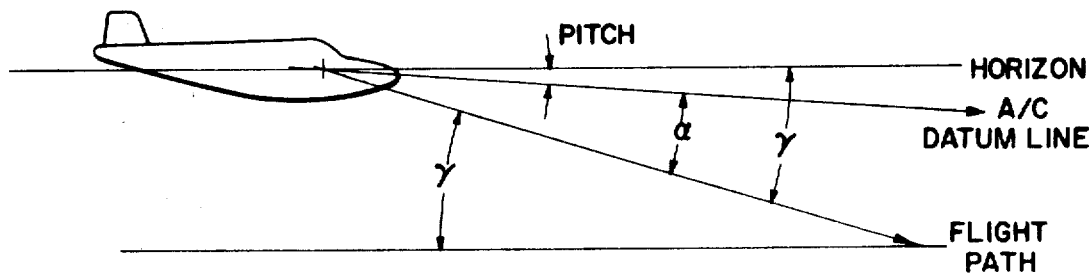
FIG. 1 is a diagram showing aircraft pitch, glide path, and angle of attack.

FIG. 1, which is presented to assist in an understanding of the invention, shows an aircraft during descent. The aircraft center line, designated on the drawing as the datum line, shows that the aircraft is pitched below the horizon by an angle P. This angle is identical with that displayed by the artificial horizon instrument on the pilot's instrument panel.

It is obvious that the aircraft illustrated in FIG. 1 is operating with reduced power, since the flight path of the aircraft makes a relatively large angle with the aircraft datum line. This flight path angle is the angle of attack, $\alpha$, of the aircraft, the angle of attack is defined as the angle between the relative wind, i.e., the flight path, and the aircraft datum line. Angle of attack information is available from any one of a number of commercially available types of sensors that are designed to produce electrical signals that are proportional to the angle of attack of the aircraft.

As shown in the drawings, the glide slope angle, $\gamma$, is the algebraic sum of the angle of attack, $\alpha$, and the pitch angle, P. Glide slope angle is the angle that the aircraft flight path makes with the horizon, as shown in FIG. 1.

Figure 2:
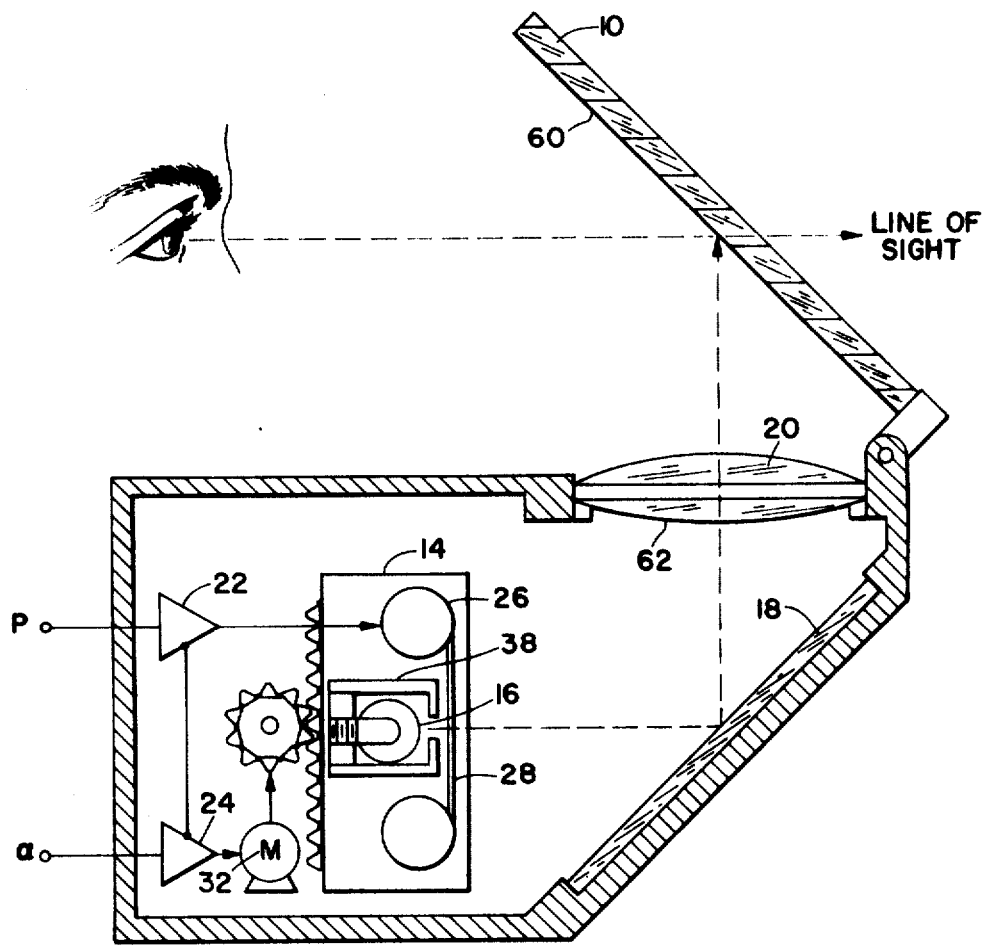
FIG. 2 is a schematic diagram of the flight path display instrument.

FIG. 2 is a simplified schematic diagram of the flight path display instrument. The instrument will accept input signals representing angle of attack, $\alpha$, and pitch angle, P, and will project, into the pilot's line of sight, reticle images representing the glide slope angle, $\gamma$, and the angle of attack, $\alpha$. The display instrument shown in FIG. 2 comprises a transparent screen or a combining glass 10 which is coated with a thin optical coating to accept a projected image of light from a display instrument. As shown in the drawing, combining glass 10 is made of a plurality of individual sections, each of which is silvered upon only those surfaces in physical contact with adjacent sections. The purpose of sectioning the combining glass 10 is to provide a "venetian blind" effect which will readily permit horizontal viewing through the combining glass, but which will be opaque at vertical angles. This prevents sunlight form entering into the optical system and damaging the reticles which are positioned at the principal focus of the optical system. A further advantage of a sectioned combining glass is to prevent the images of the reticles from being projected on the aircraft windshield, an effect that might cause confusion to the pilot.

The combining glass 10 receives the projected images of the reticles which emanate from a reticle carrier 14 within the flight display instrument. The reticles carried by reticle carrier 14 are projected, by a projection lamp 16 positioned behind the reticles, against a 45° mirror 18 and through collimating lens 20 to the surface of the combining glass 10. As previously mentioned, the reticles contained in the flight path display are driven from signals representing pitch angle, P, and angle of attack, $\alpha$. The pitch angle signal is amplified by amplifier 22 and the angle of attack signal is amplified by amplifier 24. Since the desired output of glide slope angle, $\gamma$, equals the algebraic sum of angle of attack, $\alpha$, and pitch angle, P, the servomotor 26 which drives the glide slope angle reticle 28 must receive a signal representing the sum of angle of attack and pitch angle. Therefore, amplifiers 22 and 24 must be interconnected so that amplifier 22 produces an output signal representing the algebraic sum of P and $\alpha$.

Figure 3:
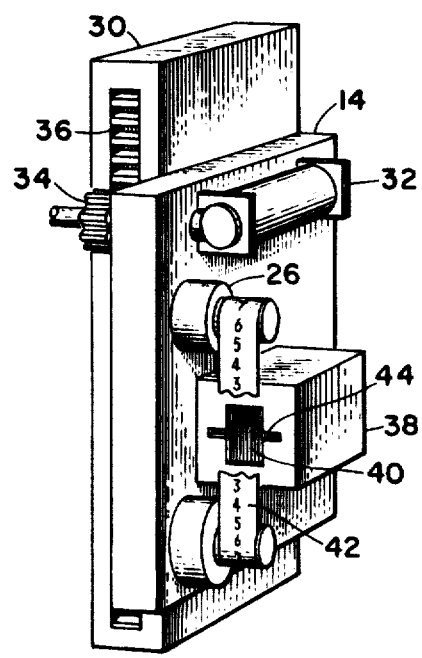
FIG. 3 is an illustration showing, in perspective the reticle servoing system of the instrument illustrated in FIG. 2.

As more clearly shown in FIG. 3, the reticle carrier 14 comprises a movable stage which is geared for vertical movement with respect to the display housing 30. The vertical movement of the reticle carrier 14 is provided by a servomotor 32, which drives a pinion gear 34 that is engaged with a rack gear 36 attached to housing 30. Servomotor 32 receives input signals from the $\alpha$ amplifier 24 and responds by providing vertical movement to the reticle carrier 14. Firmly affixed to reticle carrier 14 is lamp housing 38 which contains the lamp 16 described in connection with FIG. 2. One end of lamp housing 38 comprises a reticle 40, which, as shown in FIG. 3, is rectangularly shaped with horizontal bars 44 protruding from the sides of the rectangle. The width of a rectangular portion of reticle 40 must be slightly narrower than a tape 42, upon which is printed the glide slope angle reticle. Tape 42 is driven by servomotor 26, as explained in connection with FIG. 2, and is formed of transparent numerals upon an opaque tape, so that when passed before the rectangular portion of reticle 40, only the transparent numerals will be projected through the optical system and to the combining glass 10. The bars 44, projecting from the sides of the rectangular portion of reticle 40, comprise the angle of attack reticle, and these bars are projected with the glide slope numerals upon the combining glass 10.

OPERATION

Figure 4:
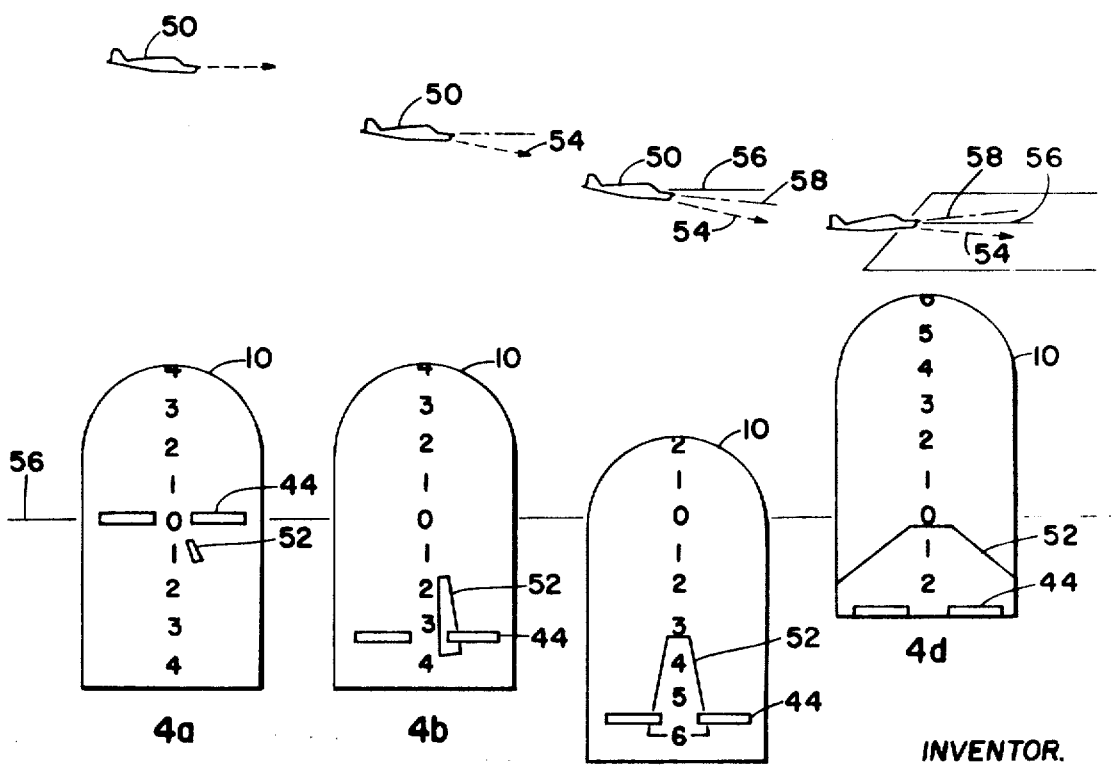
FIG. 4 is an illustration showing how the flight path display may be presented to the pilot during four stages of an approach to a landing.

FIG. 4 illustrates the operation of the invention as it would display to the pilot various information during an approach to a landing. In FIG. 4a, aircraft 50 is at cruising speed and in a normal horizontal cruising attitude. The aircraft datum line and the aircraft flight path coincide with the horizon; therefore, the angle of attack, $\alpha$, and the glide slope angle, $\gamma$, are equal to zero. The display of FIG. 4a shows bars 44 of the angle of attack reticle 40, as projected on combining glass 10, to be in line with the horizon, as represented by the 0° mark produced by the reticle on tape 42. Seen in the distance and slightly below the horizon is an airport runway 52.

In FIG. 4b the pilot, having decided to land on the airport runway 52, has reduced power and is permitting the aircraft to slow down by maintaining a horizontal attitude. Thus, the aircraft datum line remains horizontal, but the aircraft is starting to settle along a flight path illustrated by the arrow 54. The angle between the flight path and the aircraft datum line is the angle of attack, $\alpha$, which is sensed by aircraft sensors, and relayed through servoamplifier 24 to servomotor 32, which drives the carrier 14 and the bar reticle 44 to a position dictated by the signal produced by the angle of attack sensors. Aircraft runway 52, which now appears closer through the combining glass 10, is viewed by the pilot with the bars 44 aligned with the desired touch down point upon the runway 52. The glide slope angle produced by the reticle on the moving tape 42, does not move because the pitch angle of the aircraft 50 has been unchanged. This reticle does, however, illustrate to the pilot that the touch down point shown by bars 44 represents an approximate 3-½° glide slope angle for the aircraft. In certain noise sensitive metropolitan areas, such an angle would be inadequate and the pilot must maintain horizontal flight until such time as he observes that the airport touch down point is approximately 6° below the horizon.

In FIG. 4c the aircraft 50 has lowered its nose below the horizon 56 and the aircraft datum line 58 now makes the small pitch angle with the horizon 56. This pitch angle, P, is sensed by the aircraft sensors and relayed through amplifier 22 to servomotor 26, which drives tape 42 to a position dictated by the signals from the aircraft sensors. By now, the aircraft has steepened its descent and the flight path shown by arrow 54 has become larger. As viewed by the pilot through the combining glass, the reticle on tape 42 has moved upward so that the zero mark of the reticle remains on the horizon. The entire combining glass 10 is shown to be lowered, indicating that the aircraft nose has lowered. The aircraft has been aligned with airport runway 52 and the pilot has adjusted his descent so that the flight path bars 44 are properly aligned at his desired touch down point upon runway 52. The glide slope angle, produced by the reticle on the moving tape 42, illustrates that the aircraft must maintain the glide slope of approximately 5-½° in order to land at the desired point on the runway.

FIG. 4d illustrates the situation that arises after the aircraft has crossed the airport boundaries and is flared and ready for touch down upon the runway 52. At this point, the aircraft nose is high, and the aircraft datum line 58 is shown producing a nosed-up pitch. The nose-high attitude of the plane is illustrated in FIG. 4d by the higher position of the combining glass 10. The pitch angle sensors of the aircraft have adjusted the glide slope angle reticle on tape 42 so that the zero angle mark still coincides with the horizon. The angle of attack sensors on the aircraft have adjusted the reticle carrier stage 14 and the reticle bars 44 to show that the aircraft is now settling upon the runway at a glide slope angle of approximately 2-½°. At about this point in the approach, it may be advisable for the pilot to raise the nose of the aircraft even further, so that the reticle bars 44 will approach the zero glide slope angle at the instant of touch down in order to provide a smooth landing without danger of bounce.

It must be appreciated that because the reticle images are projected onto the combining glass 10 at a focus of infinity, the pilot can easily observe these reticle images without the need of refocusing his eyes and without the need of removing them from his intended flight path or point of touch down on the runway. Furthermore, because the reticle images are projected at infinity upon the surface of combining glass 10, those projected images will not change with respect to the observed background as the pilot's line of sight changes. Thus, as the pilot moves his head and his line of sight across the surface of the combining glass 10, the projected reticle images will appear stationery upon the background.

As a modification to this invention, combining glass 10 may be constructed of a single transparent glass plate which has been coated with a narrow band optical notch filter 60, as shown in FIG. 2, that passes all wavelengths except a very narrow optical band, preferably at a wavelength of approximately 6200 Angstroms. Collimating lens 20 may then be coated with a narrow band optical filter 62 which passes only that light which corresponds in wavelength with that rejected by filter 60. The reticle images are, therefore, projected upon the combining glass 10 at a particular color which will not pass through combining glass 10 and which, accordingly, must be reflected toward the pilot. The advantages of using optical interference filters 60 and 62 are that a lower intensity lamp 16 is required to project the reticle images, and that external sunlight attempting to enter the system from a vertical angle above combining glass 10 is completely reflected or absorbed before it can be focused by the collimating lens 20 upon the reticles which are positioned in its focal plane.

It is apparent that this invention will provide a pilot with all of the necessary information to make an approach at the proper glide slope angle toward a definite touch down point on the runway, and further aid him in making a perfect and soft touch down without danger of bouncing the aircraft.

I claim:

1. An aircraft display instrument for displaying aircraft flight path and a glide slope angle to the pilot, said instrument including a partially reflective combining glass positionable into the pilot's line of sight to permit the pilot to observe real world objects including a selected touchdown point, and to reflect a projected image into the aforesaid line of sight pilot; a reticle carrier positioned to project first and second reticle images onto said combining glass to be reflected thereby; a plurality of moveable reticles positioned by servomechanisms responsive to signals representing aircraft angle of attack and glide angle; and optical means for projecting at infinity an image of said plurality of reticles upon said combining glass; said plurality of moveable reticles comprising:

a first moveable reticle comprising an opaque tape having a transparent numeral scale calibrated in degrees of glide slope angle;

a second moveable reticle comprising a backlighted aperture of a width substantially corresponding to the width of said tape of said first reticle, said second reticle having transparent horizontal slots laterally extending from said aperture for projecting a horizontal bar upon said combining glass;

said first reticle overlying the backlighted aperture of said second reticle to provide a substantially single focal plane to said optical means, whereby the pilot may direct the aircraft pitch so that the reticle image of the horizontal bar appears across the selected touchdown point, and so that the pilot can adjust the aircraft speed so that the reticle image of the calibrations of a desired glide slope angle may also coincide with the selected touchdown point.